UNITED STATES PATENT OFFICE.

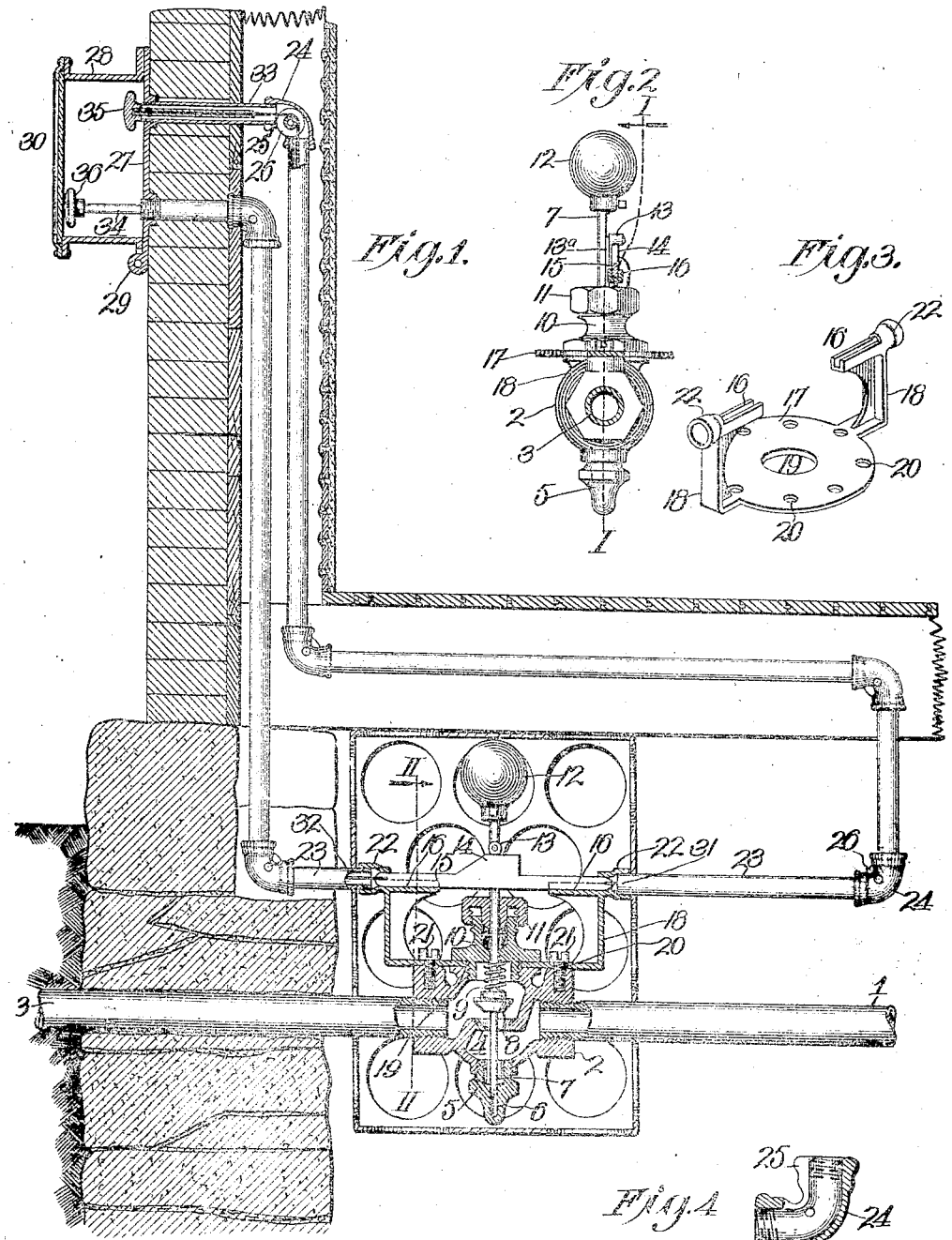

HENRY SIEBEN, OF KANSAS CITY, MISSOURI, ASSIGNOR OF ONE-FOURTH TO A. H. GLASNER AND ONE-FOURTH TO L. E. WYNE, BOTH OF KANSAS CITY, MISSOURI.

GAS-CONTROLLING APPARATUS.

No. 903,794.     Specification of Letters Patent.     Patented Nov. 10, 1908.

Application filed January 24, 1908. Serial No. 412,389.

REISSUED

*To all whom it may concern:*

Be it known that I, HENRY SIEBEN, a citizen of the United States, residing at Kansas City, in the county of Jackson and State of Missouri, have invented certain new and useful Improvements in Gas-Controlling Apparatus, of which the following is a specification.

This invention relates to gas-controlling apparatus and my object is to produce apparatus designed for use in connection with buildings to permit the gas-supply therefor to be cut off manually in the event of fire or which will automatically cut off such supply of gas in the event that it is subjected to a predetermined heat.

With this general object in view the invention consists in certain novel and peculiar features of construction and organization as hereinafter described and claimed, and in order that it may be fully understood reference is to be had to the accompanying drawing, in which,—

Figure 1, is a sectional view of a part of a building and of part of gas-controlling apparatus embodying my invention. Fig. 2, is a section on the line II—II of Fig. 1. Fig. 3, is a detail perspective view of a bracket forming part of the apparatus. Fig. 4, is an enlarged section of one of the elbows of the cable-protecting conduits forming part of the apparatus.

In the said drawings, 1 indicates the gas pipe leading from the main to a valve casing 2, the house pipe 3 leading from the casing into the building as shown or in any other suitable or preferred manner. The valve has a perforated diaphragm 4 between pipes 1 and 3 and below the perforation of the diaphragm is equipped with a removable cup 5 having its chamber reduced to provide the guide passage 6 for the stem 7 of valve 8, the said stem being equipped with a spring 9 bearing at its lower end upon the valve and at its upper end against the cap 10 closing an opening in the valve casing above the diaphragm and forming in conjunction with the cap-nut 11 a guide and stuffing box for the valve stem. The spring tends to seat the valve and cut off the supply of gas from pipe 1 to pipe 3 and to coöperate with said spring in closing the valve the stem may also be provided with a weight 12.

To hold the valve unseated normally a part such as roller 13 is carried by an angle bracket 13ª secured by a fusible substance to the valve stem, the roller resting upon the cam trackway 14 of a reciprocatory bar 15 mounted in guides 16 of a bracket consisting of a base 17 and angle arms 18 projecting from opposite sides of the base and formed integral with or carrying the guides 16. The base is adapted to rest upon the valve casing and be clamped thereon by cap 10 having a central hole 19 through which the lower part of the cap depends. The base is also provided with a circular series of holes 20 through two of which the screw bolts 21 extend down into the valve casing to prevent turning or swivel movement of the bracket on the casing, it being apparent that by the provision of a plurality of holes 20 the bracket can be faced in different directions and so secured by the same pair of screw bolts 21. The guides 16 terminate in circular heads 22 to receive the ends of a pair of similar conduits preferably consisting of tubes 23 connected by elbows 24 and leading to any point desired. The elbows in their inner sides are slotted as at 25 to conveniently receive guide rollers 26, the parts being so proportioned that the cords hereinafter referred to, cannot be disengaged from the rollers. As shown the ends of the conduits opposite to the circular heads 22 of said bracket, extend through the wall of the building contiguous to which the valve is arranged and into which the supply pipe 3 extends.

A box receives the ends of the conduits and by preference consists of a base 27 and a body portion 28. The latter is hinged by preference to the base at 29 and is adapted to be locked in any suitable manner to said base to prevent any but an authorized person from opening the box.

The outer face of the box is of glass by preference as at 30, so that any one unable to open the box in the proper manner may obtain access to it by breaking said glass, it being understood in this connection that the box by preference is located in the hallway of the building so that maliciously inclined persons can not conveniently obtain access to it.

31 and 32 indicate cords or cables extending through and peripherally engaging the rollers of their respective conduits and attached to opposite ends of the slide bar 15. The opposite end of cord or cable 31 is preferably secured in the tube 33 and the corresponding end of cord or cable 32 is secured in any suitable manner to a tube 34, which tubes project into the box and are respectively equipped with heads or handles 35 and 36. By securing the cords or cables to the tubes 33 and 34 respectively they never become exposed in the box when said handles or heads are pulled forward and consequently cannot sag from the front ends of the conduits and thus interfere with the quick and free operation of the slide bar 15.

When the slide bar is in the position shown, handle 36 is drawn forward and handle 35 is in contact with the contiguous end of its respective conduit. Should the building take fire and gain considerable headway before it was discovered and the heat rise to a predetermined point, the connection between the valve stem and the angle bracket 13ª would fuse and as a result the valve would automatically close and cut off the supply of gas to the building. Should the house occupant discover the fire before the heat was sufficient to fuse the connection mentioned, he could open the box and grasp and pull forward handle 35 and by so doing he would slide bar 15 to the right and permit the valve to close. Should the occupant fail to operate the bar any other person such as a fireman, obtaining entrance to the building, could break the glass 30 and then grasp the handle 35 and pull it forward, it being understood that when this action occurs the handle 36 is of course drawn rearward. To reset the valve in the event that the bracket 13ª remained fastened to the valve stem, the handle 36 would be drawn forward, this action reversing the operation of bar 15 and causing cam 14 to engage the roller 13 and force the same and hence valve 8 upward to their original positions.

By the arrangement described it will be seen that the cords or cables are fully protected from accidental or intentional injury, as access can not be had to break or cut them. As a further precautionary measure, the valve mechanism and the reciprocatory cam bar are contained within a perforated casing, the perforations being much larger in the drawing than they should be in practice. A perforated casing of this character will admit the heat or flame necessary to fuse the connection between the valve stem and bracket 13ª and yet will prevent said parts from being tampered with. It will furthermore serve to catch the bracket 13ª should it become detached and thus avoid the chance of the same being lost as the same bracket can be resecured in position after being detached.

From the above description it will be apparent that I have produced gas controlling apparatus embodying the features of advantage enumerated and I wish it to be understood that I do not desire to be restricted to the exact details of construction shown and described as various modifications will suggest themselves to one skilled in the art.

Having thus described the invention what I claim as new and desire to secure by Letters Patent, is:—

1. In an apparatus of the character described, a pair of pipes, a valve, yielding means tending to cause the valve to close communication between the pipes, a part fusibly connected with the valve, a cam-bar engaging said part and normally holding said valve unseated, a box, and suitably-guided flexible connections projecting into said box at one end and attached at their opposite ends to opposite ends of said cam-bar to move the same in one direction to permit the valve to be seated or in the opposite direction to raise said part and therefore the valve from its seat.

2. In an apparatus of the character described, a pair of pipes, a valve, yielding means tending to cause the valve to close communication between the pipes, a part fusibly connected with the valve, a cam-bar engaging said part and normally holding said valve unseated, a box, flexible connections projecting into said box at one end and attached at their opposite ends to opposite ends of said cam-bar to move the same in one direction to permit the valve to be seated or in the opposite direction to raise said part and therefore the valve from its seat, tortuous conduits inclosing and protecting said flexible connections for their full length, and grooved guide sheaves in said conduits at their bending points, to form guides for the said flexible connections.

3. In an apparatus of the character described, a pair of pipes, a valve, yielding means tending to cause the valve to close communication between the pipes, a part movable with the valve, a bracket rotatably adjustable with respect to the valve and provided with alined guides, a cam-bar engaging said guides and the part movable with the valve and normally holding the valve unseated, and suitably guided flexible connections attached to opposite ends of the cam-bar and provided with handles.

4. In an apparatus of the character described, a pair of pipes, a valve, yielding means tending to cause the valve to close communication between the pipes, a part movable with the valve, a bracket rotatably adjustable with respect to the valve and provided with alined guides, a cam-bar engaging said guides and the part movable with the valve and normally holding the valve unseated, suitably guided flexible connections attached to opposite ends of the cam-bar and provided with handles, and a perforated casing inclosing the valve, the bracket and the cam-bar.

In testimony whereof I affix my signature, in the presence of two witnesses.

HENRY SIEBEN.

Witnesses:
 H. C. RODGERS,
 G. Y. THORPE.